(12) United States Patent
Lang

(10) Patent No.: US 6,474,914 B1
(45) Date of Patent: Nov. 5, 2002

(54) TOOL-DRIVING DEVICE, PARTICULARLY FOR MACHINE TOOLS

(76) Inventor: Günter Lang, Goethestrasse 40/1, D-73249 Wernau (DE)

( * ) Notice: Subject to any disclaimer, the term of this patent is extended or adjusted under 35 U.S.C. 154(b) by 0 days.

(21) Appl. No.: 09/719,587

(22) PCT Filed: Apr. 12, 2000

(86) PCT No.: PCT/DE00/01127

§ 371 (c)(1),
(2), (4) Date: Dec. 14, 2000

(87) PCT Pub. No.: WO00/61329

PCT Pub. Date: Oct. 19, 2000

(30) Foreign Application Priority Data

Apr. 14, 1999 (DE) .......................................... 199 16 710

(51) Int. Cl.[7] .................................................. B23Q 5/02
(52) U.S. Cl. ............................. 409/144; 408/9; 408/61; 408/124; 408/238; 409/230; 409/231
(58) Field of Search ................................ 408/9, 16, 57, 408/59, 60, 61, 124, 238; 409/144, 230, 231, 232, 233, 234

(56) References Cited

U.S. PATENT DOCUMENTS 3,752,595 A * 8/1973 Woythal et al. ............. 408/124
4,077,736 A    3/1978 Hutchens
4,981,403 A * 1/1991 Katayama .................... 409/136
5,525,851 A    6/1996 Kumamto
5,612,544 A    3/1997 Busch
5,636,949 A * 6/1997 Nakamura et al. ........... 409/231
5,697,739 A * 12/1997 Lewis et al. ................. 409/230

FOREIGN PATENT DOCUMENTS

| CH | 682 891 | 12/1993 | |
| EP | 0 808 688 | 11/1997 | |
| JP | 173803 A * | 8/1986 | ................. 408/146 |
| JP | 63-195143 | 12/1988 | |
| JP | 01-051211 | 2/1989 | |
| JP | 1-264748 | 10/1989 | |
| JP | 93106 A * | 3/1992 | ................. 409/230 |
| JP | 8-187641 | 7/1996 | |
| JP | 11-090765 | 4/1999 | |
| SU | 645778 A * | 2/1979 | ................. 409/230 |
| SU | 689784 A * | 10/1979 | ................. 408/146 |
| SU | 1 271 676 | 11/1986 | |

* cited by examiner

Primary Examiner—Daniel W. Howell
(74) Attorney, Agent, or Firm—Venable; Norman N. Kunitz

(57) ABSTRACT

A tool-driving device (1), which is particularly provided for machine tools, has an internal drive (9), which serves to drive a tool. Also provided is a control device (36), which detects the movement of the tool-driving device (1) and correspondingly controls its drive (9). The tool-driving device (1) can thus be controlled independently of the other tool-machine controls.

37 Claims, 3 Drawing Sheets

TOOL-DRIVING DEVICE, PARTICULARLY FOR MACHINE TOOLS

Figure 1:
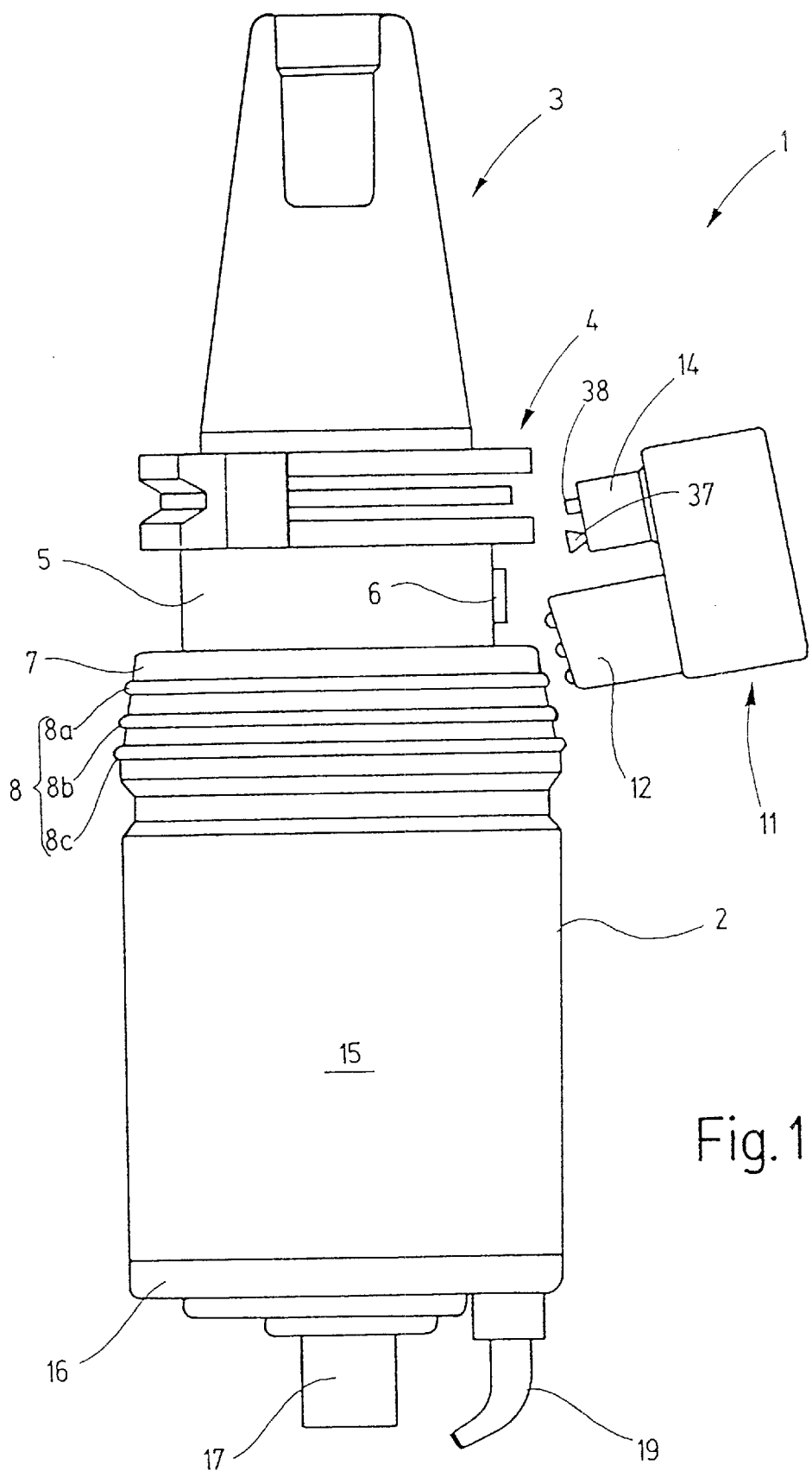

The invention relates to a tool-driving device that is particularly designed for use in machine tools or in machining units of machining centers, and has at least one machine spindle that is seated to move.

Machine tools are used especially for material-removal processes, such as boring, milling, turning on a lathe, etc.

The tool is inserted into a corresponding tool receptacle that is secured in the work spindle of the relevant machine tool. Various tool receptacles are available.

During the machining process, the work spindles are driven by associated drive apparatuses. Control devices, which can include expanded electronic circuits or execution programs, are provided for controlling the spindle movement, notably its rotation and/or adjustment.

The control device establishes the rpm of the spindle within an rpm range. This range is inherently limited. It may be that, particularly for very small tool diameters or for other reasons, rpms outside of the rpm range of the spindle are required.

It is the object of the invention to provide a tool-driving device that expands the application range of a machine tool or machining unit, preferably with as little intrusion as possible into the existing machine control.

This object is accomplished with a tool-driving device having the features of claim 1.

The tool-driving device of the invention has a spindle insert, which can preferably be clamped, fixed against relative rotation, in a machine spindle and can support a tool for machining workpieces. A coupling device serves to secure the spindle insert in the machine spindle. A drive that is supplied by a drive source located outside of the spindle insert, and can be controlled by a control device, is provided for driving the tool. The drive is effected by way of a coupling element that can be connected to the supply lines of the drive. The drive is controlled as a function of the movement of the machine spindle; the tool-driving device is provided with a detection device for detecting this movement.

From the spindle movement, the detection device obtains a signal that characterizes, for example, the rpm, and is used as an input signal for the control device for controlling the drive, and therefore the movement, of the tool. The detection of the rpm requires no access to the machine control, especially if no control signals originating from the machine control are necessary. The control device is separate from the other machine control, and is therefore independent and self-sufficient.

If desired, the power supply can be effected by the tapping of the machine control or the drive source of the machine tool. A dedicated drive source can, however, also be provided for the power supply.

The tool-driving device permits the increase of the rpm of the machine spindles above and beyond the capabilities of the machine spindle. Unlike in a passive accessory gear, in this instance the additional supply of power in the drive of the tool permits the conversion of an output that exceeds the output of the machine spindle. The maximum torque can be completely retained while the rpm is increased.

The spindle insert has a coupling device, e.g., a 7/24 taper shank, which permits a secure, detachable connection—fixed against relative rotation—with the machine spindle. It also has an essentially cylindrical, one- or multiple-part housing, inside which the drive is disposed.

If material-removal operations are to be executed with a rotating tool, the drive is embodied as a rotary drive. A motor, e.g., an electric motor, serves to drive the tool. DC motors, synchronous motors or asynchronous motors can be used for a single- or polyphase alternating current. Hydraulic or pneumatic drives, with which rotational or axial movements of the tool can be attained, can also be used. The motors can be connected to the tool directly, or via a gear in a driving arrangement.

In a preferred embodiment of the invention, a receiving apparatus is provided for receiving the tool; the apparatus has a tool spindle, into which the tool is clamped, fixed against relative rotation. The tool spindle preferably has a conical inside shape. The tool spindle is then formed by a rotatably-seated shaft, and projects out of the housing. The shaft is connected to a rotating part of the motor (internal or external rotor) so as to be fixed against relative rotation. The shaft and the tool spindle are preferably embodied to rotate symmetrically relative to an axis of rotation established by the machine spindle. The tool spindle can, however, also support a quick-clamping element, a jaw chuck or the like.

At least one slip ring, which is mounted to the outside of the housing and is electrically insulated from it, and can be brought into engagement with an associated sliding contact of the coupling element, is provided for supplying power to the electric motor. When the machine spindle rotates, the sliding contacts slide along the slip rings, thereby assuring the power supply to the drive. Rollers can also be used instead of sliding contacts. The supply can also be effected contactless, e.g., with transformers.

The slip rings are preferably disposed on a conical part of the housing whose diameter increases starting from the machine spindle. The slip rings therefore have different diameters. The smallest diameter is larger than that of an arbitrary part of the coupling device. Thus, the spindle insert can be inserted into the machine spindle without altering the position of the contact set. The contact set can then be rigidly secured to the machine tool, in which case it is disposed at a slight incline, corresponding to the incline of the conical housing part. The insertion of the spindle insert produces the contact between the slip rings and the sliding contacts. The contact set can also be seated to be adjusted, and/or can be separate.

The safety of the tool-driving device is increased when voltage is only applied to the sliding contacts during the machining process. If the detection device detects rpms that are at least as high as a defined threshold value, preferably 30 rpm, the current supply to the sliding contacts is enabled, for example, by the automatic closure of a switch. The circuit is opened at rpms below the threshold value.

Contactless, magnetic or optical methods are preferred for rpm detection. For example, a metal part connected to rotate with the spindle insert or the machine spindle can serve to induce a short voltage pulse in a stationary coil with each rotation.

In an advantageous embodiment, the detection device has a signal generator, particularly a light source, and a signal receiver, particularly a light sensor. The detection device is preferably adjustably mounted to the machine tool, for example to the spindle head that guides the machine spindle. A marking, such as a narrow metal plate, that reflects the light emitted by the light source is secured to the tool coupling or the machine spindle. A signal that is thereby generated, and characterizes the rpm of the machine spindle, e.g., a pulse signal that is proportional thereto, is then transmitted to the control device.

A circular clamping body having different visual properties from the location where it is to be secured can serve as a marking. The clamping body can have a gap or a recess.

The passage of the gap or recess in front of the sensor generates the signal.

Markings that effect the generation of a plurality of signals with each rotation can also be provided. In the simplest case, the markings can be equidistantly spaced and provided on, for example, an adhesive strip.

The control device utilizes the signals arriving from the detection device to generate a corresponding drive signal for the drive. Hence, the rpm range of the tool can be expanded with the device of the invention. Existing machine tools can therefore be rendered more versatile without its mechanical or electronic components being disturbed.

The control device can be integrated into the spindle insert, or accommodated separately. It can also be controlled by programs running on a computer. A console can be provided for the user.

At least one supply line for a cooling fluid or compressed air is preferably provided in the tool-driving device for cooling the tool, as is an outward-oriented nozzle, which is preferably pivotable and comprises plastic, for example. At the same time, the nozzle can conduct heat out of the tool-driving device.

Further advantageous details about embodiments of the invention ensue from the dependent claims, the drawing and/or the associated description.

Figure 2:
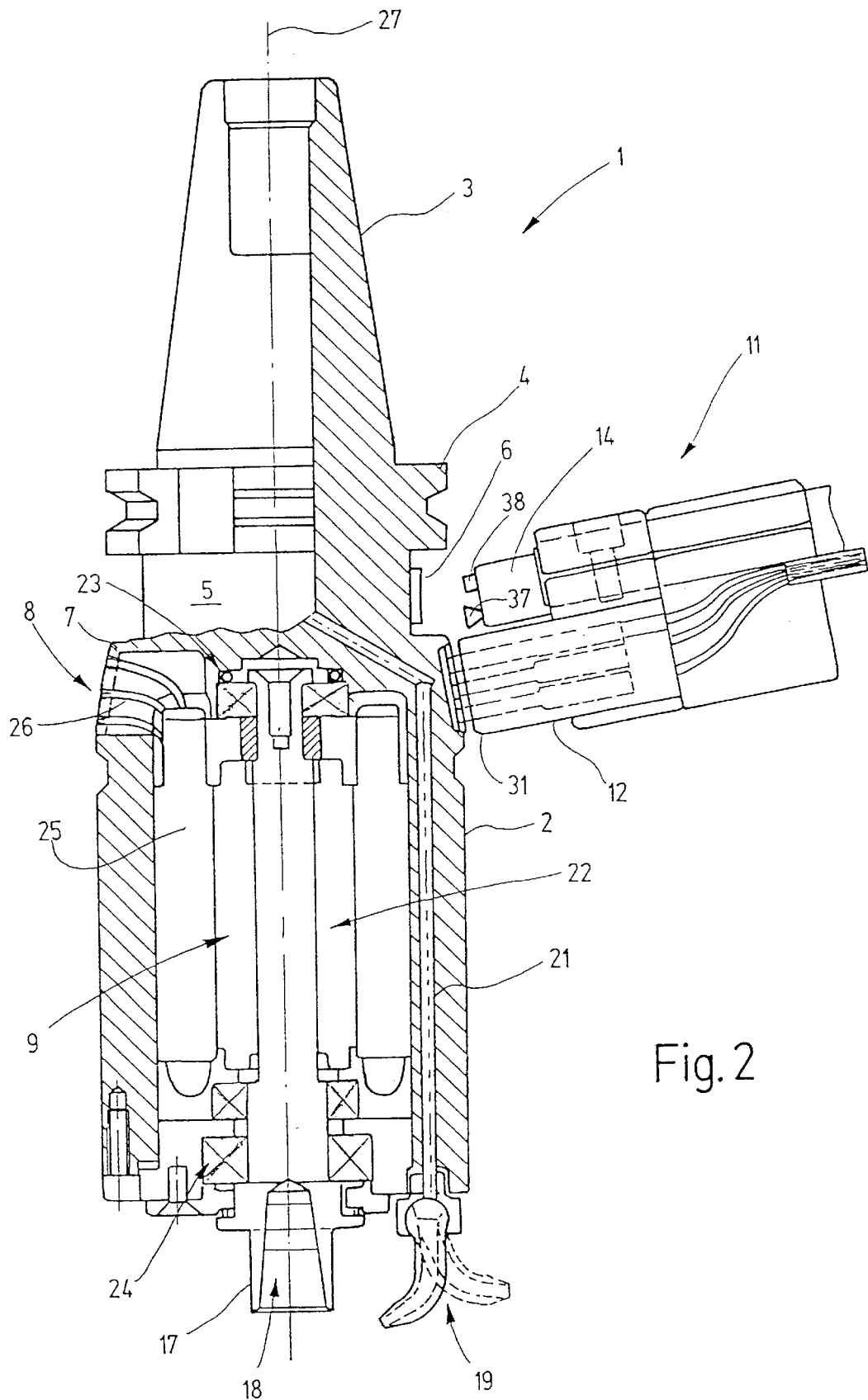
Figures 3, 4:
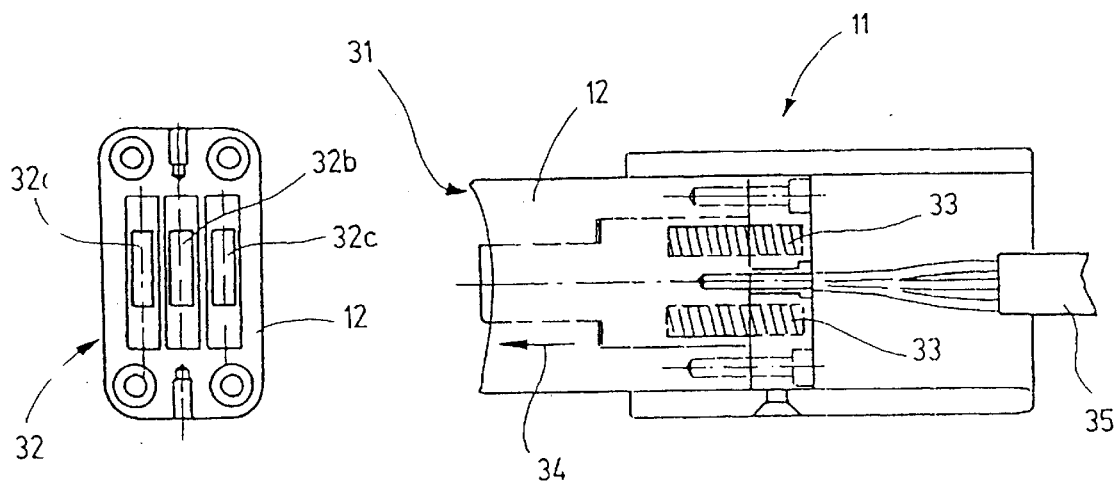
Figure 5:
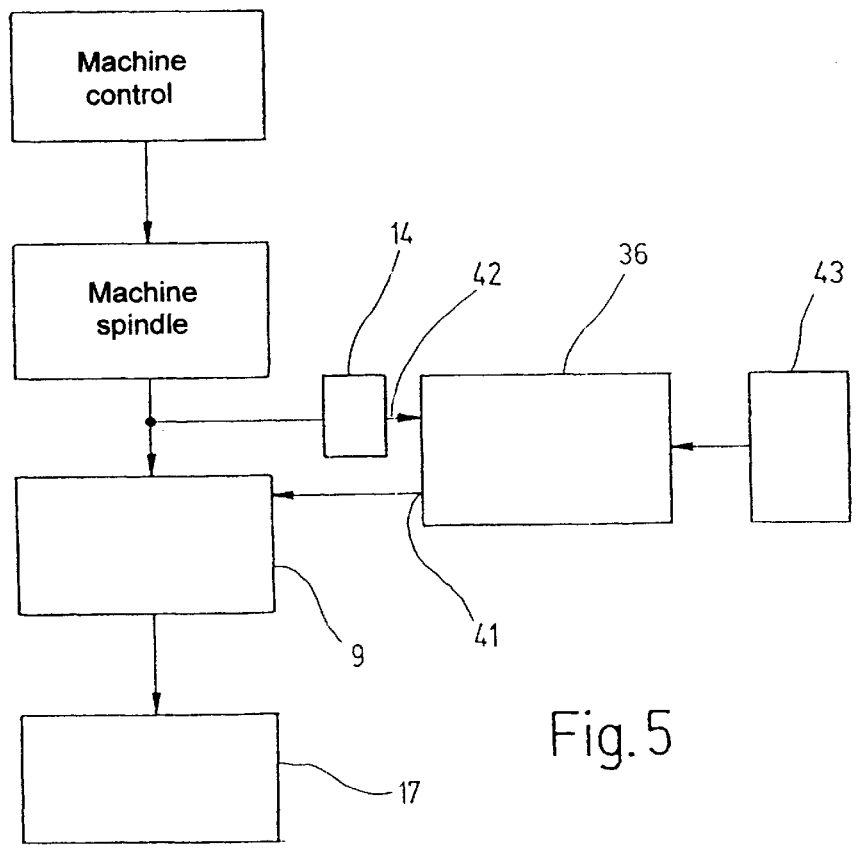

The drawing illustrates an embodiment of the subject of the invention. Shown are in:

FIG. 1 a tool-driving device according to the invention, in a partly schematic front view;

FIG. 2 a front view of the tool-driving device from FIG. 1, in a partly cutaway and partly schematic representation;

FIG. 3 a side view of the coupling element used in the device of the invention according to FIGS. 1 and 2, in a partly schematic representation;

FIG. 4 a plan view of the coupling element from FIGS. 1 through 3, in a partly schematic representation; and FIG. 5 a schematic representation of the operating principle of the device according to the invention.

As shown in a schematic, general view in FIG. 1, a tool-driving device 1 has a housing 2, which has an essentially cylindrical shape. At one end of the housing 2 is a 7/24 taper shank 3, which is received in a corresponding chuck, not shown in detail, of a machine spindle. A clip disk 4 adjoins the 7/24 taper shank 3. A short, cylindrical segment 5, which directly adjoins the clip disk 4, but has a smaller diameter than the disk, serves as a carrier for marks 6, the constitution and significance of which will be discussed later.

Adjoining the cylindrical segment 5 is a conical connecting segment 7, whose smallest diameter adjoins the cylindrical segment 5. The diameter here is, however, already larger than that of the clip disk. The conical connecting segment 7 has one or more—in the present embodiment, three—slip ring(s) 8 (8a, 8b, 8c) for supplying current to a drive 9 disposed in the housing 2, as can be seen in FIG. 2. A connecting head 11, which supports a contact carrier 12 and a sensor unit 14, is associated with the slip rings 8 and the marking 6. The connecting head 11 is preferably permanently mounted to the machine tool for which the tool-driving device 1 is to be used. As an alternative, the connecting head 11 can be mounted to a carrier that permits a radial movement of the connecting head 11, and only brings it into the connecting position when the tool-driving unit 1 is to be secured to the machine spindle. If other tools are to be used, the connecting head 11 can be moved out of the way. This is not necessary in most cases, however.

Adjoining the conical connecting segment 7 in the tool-driving unit 1 is a cylindrical housing part 15, whose end remote from the 7/24 taper shaft 3 is closed with a lid 16. The lid has a central opening, through which a rotatably-seated spindle 17 projects. The spindle is provided for receiving tools, and, as can be seen from FIG. 2, has an inside cone 18. Adjacent to the spindle 17 is a nozzle 19, which is preferably seated to move, and is connected to a conduit 21, which can serve in conveying cooling lubricants.

As can be seen from FIG. 2, the drive 9, in the form of an electric motor 22, is disposed inside the housing 2, preferably essentially in a space surrounded by the housing part 15. The spindle 17 forms the motor shaft, and is rotatably seated at both ends of the electric motor 22 by ball bearings 23, 24. The electric motor 22 can be a servomotor, a stepping motor, a three-phase asynchronous motor, a synchronous motor or another suitable electric motor. It can be embodied as a pancake motor or a drag-cup motor if small moments of inertia are necessary. In addition, a gear, such as a planetary gear, can be provided between the electric motor 22 and the coupling formed by the inside cone 18 for coupling a tool, for the purpose of altering the rpm, particularly increasing it, or for generating additional movements, for example axial movements. If needed, this can also be effected with further drives.

Lines 26 lead from the stator 25 of the electric motor 22 to the slip rings 8, which are disposed in an uninterrupted, concentric arrangement relative to an axis of rotation 27. The 7/24 taper shank 3, the housing 2 and the spindle 17 are likewise arranged concentrically with respect to this axis of rotation 27.

The connecting head 11 is shown separately in FIGS. 3 and 4. Disposed on its side 31 facing the tool-driving device 1 are sliding contacts 32 (32a, 32b, 32c); springs 33 prestress these contacts radially, with respect to the axis of rotation 27, in the direction of an arrow 34 indicated in FIG. 4. The sliding contacts 32 are connected to an actuation unit 36 via lines 35. The actuation unit 36 generates actuation signals for the drive 9, which is shown as a block in FIG. 5.

The actuation unit 36 is also connected to the sensor head 14, and receives signals from it that correspond to the rpm of the machine spindle. For this purpose, the markings 6 that cooperate with the sensor head 14 (FIGS. 1 and 2) are provided. The markings can be, for example, recesses or projections on the segment 5 of the tool-driving unit 1. The sensor head 14 includes a corresponding detection device for these recesses or projections, such as a magnetic detection device. In the present case, however, the sensor head 14 is based on an optical principle. A light source 37 illuminates the segment 5, and a sensor 38 registers the reflected light. The reflective behavior of the marking 6 differs from that of the remainder of the segment 5. For example, the marking 6 can be formed by a slotted plastic ring that partly extends around the segment 5 and leaves open a smaller segment between its two free, oppositely-located ends; the sensor head detects the passage of this segment. Thus, with each rotation of the machine spindle, and therefore each rotation of the tool-driving device 1, a signal is generated at the sensor 14. Alternatively, a plurality of marks can be provided, which then generate a plurality of signals. If need be, other devices, such as a monochromatic or marked adhesive strip, can be used as markings 6 in place of the plastic ring.

At its output 41, the actuation unit 36 generates signals that correspond to the frequency of the signals received at its input 42. An operator terminal 43 can be used to determine the matchup, and, for example, which input rpm (input 42)

generates which output rpm (output 41). As an alternative, the matchup can be fixedly set, or a data interface with a computer can be used to set the matchup.

The described tool-driving device 1 operates as follows:

The tool-driving device 1 can be stored in the magazine of a machine tool, or in a separate storage device. It can be equipped in advance with, for example, a tool whose shaft is received in the inside cone 8 of the spindle 17. To set up the tool-driving device 1 for operation, the connecting head 11 is mounted to the machine tool, at a suitable location near the spindle. The connecting head 11 remains in or on the machine tool. The connecting head 11 is disposed at a large enough distance from the work spindle to permit the free passage of a clip disk 4, so the connecting head does not impede the exchange of a conventional tool.

Moreover, the control device of the tool-driving device 1 is mounted in or on the machine tool. The control device includes the actuation unit 36 and an optional operator unit 43. When the tool-driving unit 1 is to be operated, it is inserted into the machine spindle, i.e., coupled to it, like a conventional tool. This process is effected essentially by an axial movement in the direction of the axis of rotation 27. The clip disk 4 passes the contact head 12 without touching it. While the 7/24 taper shank 3 is located in a corresponding receptacle, the contacts 32 of the contact head 12 come into contact with the slip rings 8. The marking 6 also comes into the viewing field of the sensor head 14.

The operator unit 43 is used now or in advance to determine how the drive 9 is to be actuated with actuation pulses originating from the sensor head 14. For example, a fixed rpm can be set. If the rpm ratio is set at a factor of 5, for example, a rotation of the machine spindle at 100 rpm causes the control unit 36 to emit pulses for 500 rpm, correspondingly actuating the drive 9. The rpms are added, so the spindle 17 rotates at 600 rpm. If the rpm of the machine spindle is increased to, for example, 5000, the drive 9 is actuated at five times the rpm, i.e., 25,000. These rpms are added to the spindle rpm, so the spindle 17 ultimately rotates at 30,000 rpm.

In this way, the machine spindle can attain rpms that it otherwise could not. In addition, the operator unit 43 can be used, if needed, to effect a stepless variation in the rpm of the spindle 17.

Unlike in the described embodiment, but within the scope of the invention, the actuation unit 36 and the operator unit 43 can be integrated into the tool-driving device 1. The marking 6 is then permanently applied outside of the tool-driving device 1. Instead of the marking 6, a corresponding reading head can be provided on the tool-driving device 1. If the tool-driving device 1 is separate from the machine tool, the actuation unit 36 is set through, for example, pre-programming. Operator elements can be provided on the tool-driving unit, or an interface to a computer or other operator unit can be provided. In this embodiment, the power supply can be effected externally, as is apparent in FIGS. 1 and 2.

An advantage of the above-described embodiments is that non-whole-number rpm ratios can also be set through the corresponding programming of the actuation unit 36. If needed, however, this programming option can be omitted. In a simplified embodiment, it is also possible, for example, to change the rpm merely by changing the number of marks 6 present on the segment 5. To this end, a suitable adhesive strip provided with marks can be used. The marks themselves can also be represented by an adhesive strip. In all cases, the tool-driving device 1 is controlled without disturbing the machine control of the machine tool.

A tool-driving device 1 that is particularly provided for machine tools has an internal drive 9, which serves to drive a tool. Furthermore, a control device 36 is provided, which detects the movement of the tool-driving device 1 and correspondingly controls its drive 9. The tool-driving device 1 can therefore be controlled independently of the other machine-tool controls.

What is claimed is:

1. A tool-driving device (1) for a machine having at least one movably-seated machine spindle,
    having a spindle insert (2), which includes a coupling device (3) that can be connected to the machine spindle, a controllable drive (9) for driving a tool that is designed to convert its drive energy into mechanical energy, and at least one supply line (8), which serves to transmit the drive energy to the drive (9),
    having a coupling element (11), with which an energy-transmitting connection can be produced and broken between a drive source and the drive (9),
    having a detection device (14), which serves to detect the movement of the machine spindle, and
    having a control device (36), which is designed to control the drive (9) as a function of the movement of the machine spindle.

2. The tool-driving device according to claim 1, characterized in that the movement of the machine spindle is a rotational movement.

3. The tool-driving device according to claim 1, characterized in that the control device (36) is controlled exclusively by the movement of the machine spindle.

4. The tool-driving device according to claim 1, characterized in that the coupling device (3) is a taper shank that can be clamped into a machine spindle, and a cylinder segment (5) provided as a carrier for a marking (6) is connected to an adjoining clip disk (4) that has a gripping groove for an automatic tool exchange.

5. The tool-driving device according to claim 1, characterized in that the drive (9) is an electric motor (22) that serves as a rotational drive.

6. The tool-driving device according to claim 1, characterized in that the drive (9) is in a driving connection with a receiving apparatus (18) for a tool.

7. The tool-driving device according to claim 6, characterized in that the receiving apparatus (18) for the tool projects out of the housing (2) on a spindle (17) on the side opposite the coupling device (3).

8. The tool-driving device according to claim 7, characterized in that the spindle (17) is embodied to rotate symmetrically relative to an axis of rotation (27) established by the machine spindle.

9. The tool-driving device according to claim 1, characterized in that the supply line (8) includes one or more slip rings (8), the ring(s) being mounted to the outside of the housing (2) and electrically insulated from it.

10. The tool-driving device according to claim 9, characterized in that the slip ring or rings (8) is or are disposed on a conical part (7) of the housing (2), with the diameter of the smallest slip ring (8) being at least as large as the largest diameter of the tool coupling (3) or an adjoining clip disk (4).

11. The tool-driving device according to claim 1, characterized in that the coupling element (11) essentially has a contact set (32), which includes one or more sliding contacts (32a, 32b, 32c).

12. The tool-driving device according to claim 11, characterized in that the contact set (32) is mounted to move.

13. The tool-driving device according to claim 11, characterized in that voltage is not applied to the sliding contacts (32*a*, 32*b*, 32*c*) until the detection device (12) detects a rotational movement of the machine spindle at a minimum rpm.

14. The tool-driving device according to claim 1, further comprising means for contactless detection of the rotational movement.

15. The tool-driving device according to claim 14, characterized in that the detection device (12) includes a signal generator (37) for emitting a signal, and a signal receiver (38) for detecting the signal.

16. The tool-driving device according to claim 15, characterized in that the signal generator (37) is a light source, and the signal receiver (38) is a light sensor.

17. The tool-driving device according to claim 16, characterized in that the detection device (12) formed by the signal generator (37) and the signal receiver (38) and is adjustable in height and position.

18. The tool-driving device according to claim 17, characterized in that a reflecting element (6) is mounted to the tool-driving device (1), and is oriented to reflect the light emitted by the light source to the sensor.

19. The tool-driving device according to claim 17, characterized in that an essentially circular clamping body can be mounted to the tool-driving device (1) with the surface of the clamping body possessing different reflective properties from the surface on which it is seated and held.

20. The tool-driving device according to claim 1, characterized in that it has at least one supply line (21) and an outward-oriented, nozzle (19), the line and nozzle serving to supply a cooling medium to the tool.

21. The tool-driving device according to claim 5, characterized in that the electric motor (22) is one of a DC motor, a single- or polyphase synchronous motor, and an asynchronous motor.

22. The tool-driving device according to claim 7, characterized in that the receiving apparatus is an inside cone.

23. The tool-driving device according to claim 11, characterized in that the one or more sliding contacts correspond to the number of slip rings.

24. The tool-driving device according to claim 11, characterized in that the one or more contacts are carbon brushes or rollers and are connected to at least one of a power source and a control device by way of a supply line.

25. The tool-driving device according to claim 12, characterized in that the contact set is mounted to the machine tool.

26. The tool-driving device according to claim 12, characterized in that the contact set is mounted on a spindle head that supports the machine spindle.

27. The tool-driving device according to claim 13, characterized in that the minimum rpm is 30 rpm.

28. The tool-driving device according to claim 14, wherein the means for contactless detection detects the rotational movement at least one of optically and magnetically.

29. The tool-driving device according to claim 17, characterized in that the detection device is mounted to the machine tool.

30. The tool-driving device according to claim 17, characterized in that the detection device is mounted to the spindle head that guides the machine spindle.

31. The tool-driving device according to claim 18, characterized in that the reflecting element is one of a wafer and a film.

32. The tool-driving device according to claim 19, characterized in that the clamping body is provided with at least one of a gap and a recess.

33. The tool-driving device according to claim 19, characterized in that the clamping body is mounted to a cylindrical segment of the tool-driving device.

34. The tool-driving device according to claim 20, characterized in that the least one supply line is disposed inside the housing and extends essentially parallel to its axis of rotation.

35. The tool-driving device according to claim 20, characterized in that the nozzle is pivotable.

36. The tool-driving device according to claim 20, characterized in that the nozzle includes plastic.

37. The tool-driving device according to claim 20, characterized in that the cooling medium is at least one of a cooling fluid and a compressed air.

* * * * *